United States Patent
Connolly

(10) Patent No.: US 10,201,998 B2
(45) Date of Patent: *Feb. 12, 2019

(54) WHEEL WITH FLEXIBLE WIDE-BODY SPOKES

(71) Applicant: Spinergy Inc., Carlsbad, CA (US)

(72) Inventor: Martin Connolly, San Marcos, CA (US)

(73) Assignee: Spinergy Inc.

( * ) Notice: Subject to any disclaimer, the term of this patent is extended or adjusted under 35 U.S.C. 154(b) by 10 days.

This patent is subject to a terminal disclaimer.

(21) Appl. No.: 15/358,900

(22) Filed: Nov. 22, 2016

(65) Prior Publication Data
US 2017/0232788 A1    Aug. 17, 2017

Related U.S. Application Data

(60) Continuation of application No. 14/666,175, filed on Mar. 23, 2015, now Pat. No. 9,597,925, which is a division of application No. 13/487,253, filed on Jun. 4, 2012, now Pat. No. 8,985,707.

(51) Int. Cl.
| | |
|---|---|
| *B60B 1/02* | (2006.01) |
| *B60B 1/04* | (2006.01) |
| *B60B 1/00* | (2006.01) |
| *B60B 9/26* | (2006.01) |
| *B60B 5/02* | (2006.01) |
| *B60B 21/06* | (2006.01) |

(52) U.S. Cl.
CPC ............ *B60B 1/0261* (2013.01); *B60B 1/003* (2013.01); *B60B 1/006* (2013.01); *B60B 1/042* (2013.01); *B60B 1/044* (2013.01); *B60B 5/02* (2013.01); *B60B 9/26* (2013.01); *B60B 21/062* (2013.01); *B60B 2360/32* (2013.01); *B60B 2360/341* (2013.01); *B60B 2900/111* (2013.01); *B60B 2900/212* (2013.01); *B60B 2900/311* (2013.01); *B60B 2900/313* (2013.01); *B60Y 2200/12* (2013.01); *B60Y 2200/13* (2013.01); *B60Y 2200/84* (2013.01)

(58) Field of Classification Search
CPC ....... B60B 1/003; B60B 1/0261; B60B 1/041; B60B 1/042; B60B 1/043; B60B 1/044; B60B 1/045; B60B 1/046; B60B 5/02; B60B 21/062; B60B 21/064
See application file for complete search history.

(56) References Cited

U.S. PATENT DOCUMENTS

| | | |
|---|---|---|
| 706,659 A | 8/1902 | Howard |
| 4,729,605 A | 3/1988 | Imao et al. |
| 5,110,190 A | 5/1992 | Johnson |
| 5,350,221 A | 9/1994 | Pierce et al. |

(Continued)

FOREIGN PATENT DOCUMENTS

| | | |
|---|---|---|
| EP | 1101631 A1 | 11/2000 |
| EP | 1167078 A1 | 1/2001 |

*Primary Examiner* — Kip T Kotter
(74) *Attorney, Agent, or Firm* — Gary L. Eastman, Esq.; Eastman & McCartney LLP

(57) ABSTRACT

A wheel with flexible spokes, including a rim and hub, and spokes between the rim and hub made of fibrous material that causes the spokes to be both lighter in weight and stronger than comparable steel spokes. The spokes are also flexible and resilient such that they can bend while retaining their integrity and strength.

19 Claims, 3 Drawing Sheets

(56) References Cited

U.S. PATENT DOCUMENTS

| | | |
|---|---|---|
| 5,779,323 A | 7/1998 | Burrows |
| 5,915,796 A | 6/1999 | Beyer |
| 6,036,281 A | 3/2000 | Campbell |
| 6,216,344 B1 | 4/2001 | Mercat et al. |
| 6,247,382 B1 | 6/2001 | Umeki et al. |
| 6,378,953 B2 | 4/2002 | Mercat et al. |
| 6,520,595 B1 | 2/2003 | Schlanger |
| 6,846,047 B2 | 1/2005 | Dietrich |
| 6,886,892 B2 | 2/2005 | Chiang et al. |
| 6,899,401 B2 | 5/2005 | Schlanger |
| 7,077,480 B2 | 6/2006 | Hjerterb et al. |
| 7,083,239 B2 | 8/2006 | Okajima |
| 7,090,307 B2 | 8/2006 | Okajima |
| 7,093,910 B2 | 8/2006 | Hjerterb et al. |
| 7,140,696 B1 | 11/2006 | Guzik |
| 7,192,097 B2 | 3/2007 | Schlanger |
| 7,290,839 B2 | 11/2007 | Okajima |
| 7,631,945 B2 | 3/2009 | Addink |
| 7,562,940 B2 | 7/2009 | D'Aluisio |
| 7,562,942 B2 | 7/2009 | D'Aluisio |
| 7,631,947 B2 | 12/2009 | Mercat et al. |
| 7,658,450 B2 | 2/2010 | Mercat et al. |
| 7,784,878 B2 | 8/2010 | Schlanger |
| 7,926,884 B2 | 4/2011 | Heyse |
| 7,926,885 B2 | 4/2011 | Saillet et al. |
| 7,950,747 B2 | 5/2011 | Mercat et al. |
| 7,988,240 B2 | 8/2011 | Lubecki |
| 8,162,407 B2 | 4/2012 | Mercat et al. |
| 9,597,925 B2 * | 3/2017 | Connolly .............. B60B 1/0261 |
| 2004/0222690 A1 * | 11/2004 | Okajima ............... B60B 1/0284 |
| | | 301/58 |
| 2007/0080577 A1 * | 4/2007 | Fioravanti .............. B60B 1/041 |
| | | 301/104 |
| 2011/0215636 A1 * | 9/2011 | Huang ..................... B60B 1/02 |
| | | 301/56 |

\* cited by examiner

WHEEL WITH FLEXIBLE WIDE-BODY SPOKES

RELATED APPLICATIONS

This application is a continuation of U.S. patent application Ser. No. 14/666,175 entitled "Wheel with Flexible Wide-Body Spokes" filed Mar. 23, 2015 now U.S. Pat. No. 9,597,925, which is a divisional of U.S. patent application Ser. No. 13/487,253 entitled "Wheel with Flexible Wide-Body Spokes" filed Jun. 4, 2012, issued as U.S. Pat. No. 8,985,707.

FIELD OF INVENTION

The present invention is directed to vehicular wheels having high-strength and light-weight spokes, particularly bicycle, motorcycle, and wheelchair wheels.

BACKGROUND OF INVENTION

The most common construction for bicycle wheels includes spokes made of stainless steel or other metal. While stainless steel is strong, it is also heavy. Therefore, the spokes must be made as thin as possible to make them as light as possible. However, the thinner the spoke, the less strength it has. The thicker the spoke, the stronger it is. Therefore, in making spokes of steel, there is a tradeoff between making the spokes strong and making them light-weight. Thus, there is a need for a wheel with spokes that can be both lightweight and strong without having to deal with this tradeoff between the two. Another problem with steel spokes is that, if they are bent, they weaken and ultimately fail such that they must be replaced if bent.

One solution to this problem was presented in U.S. Pat. No. 5,110,190 which issued to Harold Johnson on May 5, 1992, for an invention entitled "High Modulus Multifilament Spokes And Method" (hereinafter the "'190 patent"). The '190 patent is fully incorporated herein by this reference. The '190 patent discloses a high modulus multifilament non-rigid and rigid wheel spoke that includes a fiber mid-portion between a first and second end having attachment members affixed thereto. The '190 patent also discloses methods of supporting a hub within a wheel rim by means of a plurality of spokes or by means of continuous lengths of spokes.

While the device presented in the '190 patent clearly made advancements over the state of the art at that time, the device nevertheless has its shortcomings. For instance, the small diameter of the filament spokes requires that the spokes be maintained in a substantially axial arrangement with its connectors. This, unfortunately, makes the manufacturing of wheels incorporating the '190 technology more difficult due to the of off-axis tension. Specifically, even though the spokes of the '190 patent are orders of magnitude stronger than their metallic counterparts, the strength of the '190 spokes is slightly decreased from its maximum strength due to the bend in the spokes as they leave the wheel rim when installed hi a wheel.

U.S. Pat. No. 6,036,281 which issued on Mar. 14, 2000, to Richard Campbell and entitled "Low Rotational Mass Bicycle Wheel System" (hereinafter the '281 patent), disclosed a bicycle wheel system having spokes extending radially from hub to spoke. The spokes are provided with fittings at its rim end which are constructed with minimal mass and fittings at the hub end which allow adjustment of the tension of the spoke. The spokes are constructed of a bundle of liquid crystal fibers having no significant creep surrounded by an extruded plastic jacket.

While the spoke presented in the '281 patent certainly represents a milestone in bicycle wheel technology and light-weight wheel manufacturing, it nevertheless has its challenges with implementation. First of all, there are manufacturing challenges in keeping the spokes aligned with their connectors. In narrow-width wheel applications, the device disclosed in the '281 are difficult to install as the alignment is important. This alignment results in increased assembly costs and overall product costs.

The present invention resolves these problems by providing spokes that are both lighter in weight than steel and significantly stronger than steel, and that are flexible such that they can bend without suffering damage. Moreover, due to their significant strength and durability, fewer numbers of spokes are required on wheels while still providing a light-weight wheel with superior strength.

SUMMARY OF THE INVENTION

The wheel with flexible wide-body spokes of the present invention provides the aforementioned advantages by providing a wheel including a rim and hub, and spokes between the rim and hub made of fibrous material that causes the spokes to be both lighter in weight and stronger than comparable steel spokes. The spokes are also flexible and resilient such that they can bend while retaining their integrity and strength.

BRIEF DESCRIPTION OF DRAWINGS

The aforementioned and other advantages of the wheel with flexible spokes of the present invention will become more apparent to those skilled in the art upon making a thorough review and study of the following detailed description of the invention when reviewed in conjunction with the drawings in which like references numerals refer to like parts, and wherein.

DETAILED DESCRIPTION OF THE INVENTION

Figure 1:
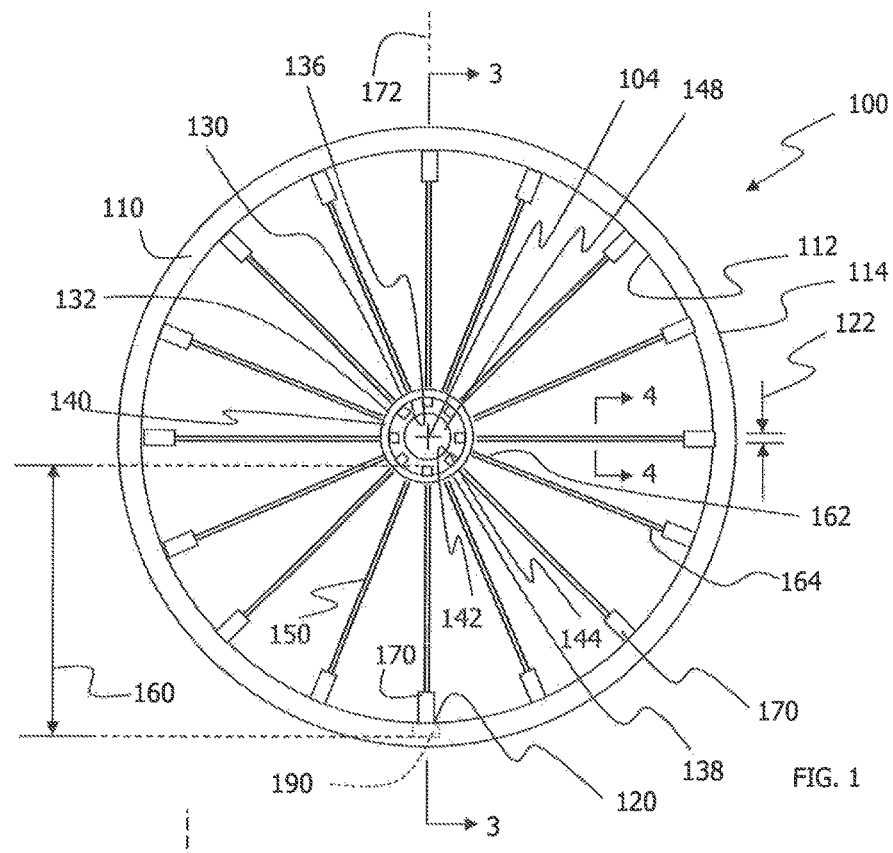
FIG. 1 is a side view of a first preferred embodiment of the wheel with flexible spokes of the present invention, showing the rim, hub, spokes between rim and hub, tubes attaching each spoke to the rim, and anchors attaching each spoke to the hub.

Referring to FIG. 1, a side view of a first preferred embodiment of the wheel with flexible spokes of the present invention is shown and generally designated 100. In FIG. 1, the side of wheel 100 facing the viewer can be referred to as the right side of the wheel 100. The side of wheel 100 opposite the right side can be referred to as the left side of the wheel 100. The wheel 100 has a wheel axis 104, and a rim 110 which has an inner perimeter 112 and an outer perimeter 114.

Figures 3, 4:
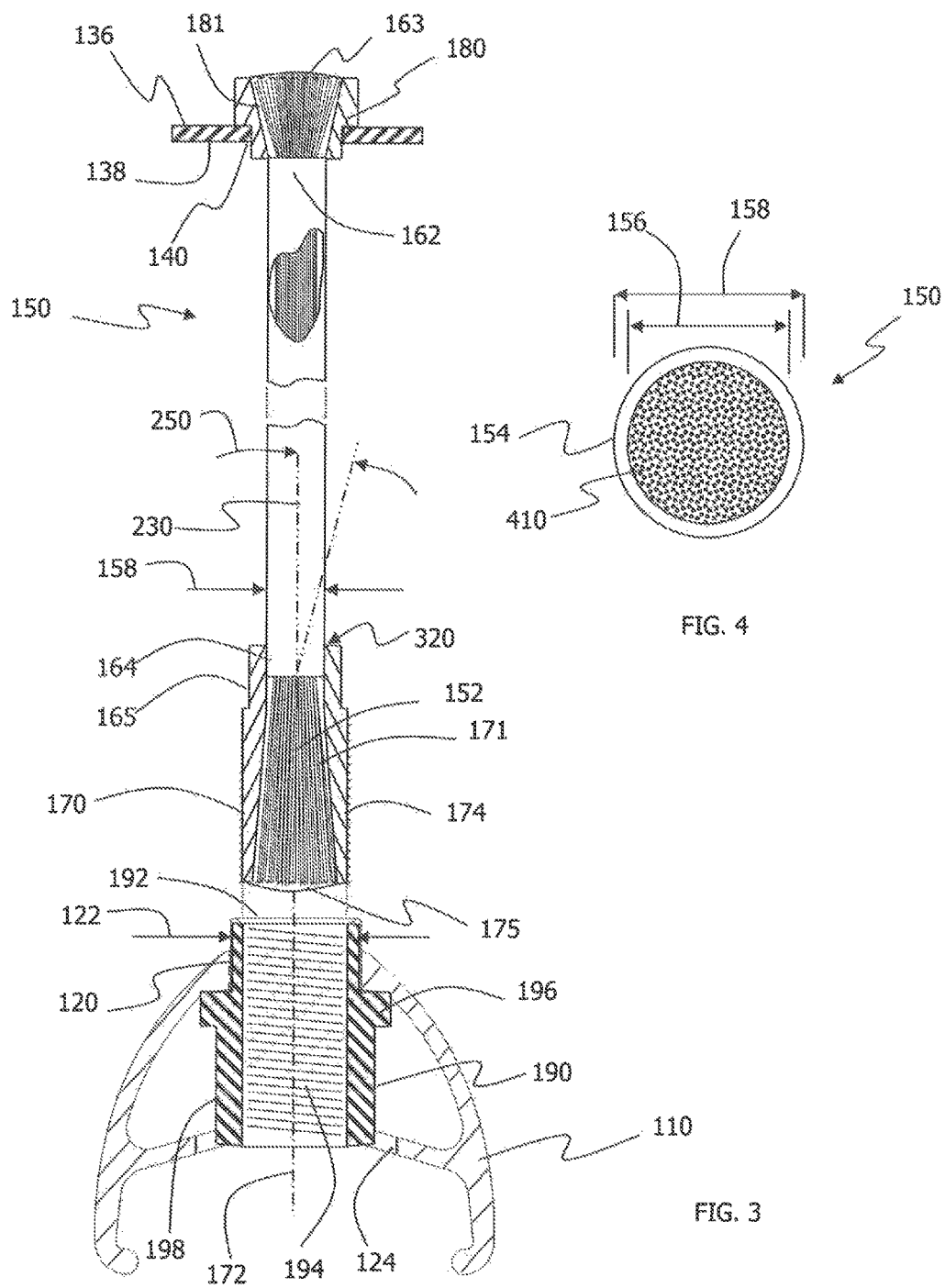
FIG. 3 is a cross-sectional view of the first preferred embodiment of the wheel with flexible spokes of the present invention, taken across line 3-3 of FIG. 1, showing cross-sectional portions of the rim and hub, and showing how each tube attaches each spoke to the rim via a nipple in the rim, and how each anchor attaches each spoke to the hub.
FIG. 4 is a cross-sectional view of the first preferred embodiment of the wheel with flexible spokes of the present invention, taken across line 4-4 of FIG. 1, showing a cross-sectional view of the fibers and jacket of one of the spokes.

Still referring to FIG. 1, with reference to FIG. 3, distributed symmetrically along inner perimeter 112 are spoke holes 120. Each spoke hole 120 has a spoke hole width 122. Along the outer perimeter 114 are nipple access holes 124 (not visible in FIG. 1), one nipple access hole 124 adjacent each spoke hole 120. Wheel 100 further includes a hub 130 having a right flange 132 and a left flange 134 (not visible, behind right flange 132). Each flange 132 and 134 has an inner surface 136 and an outer surface 138. In each flange 132 and 134 are flange holes 140, each flange hole 140 corresponding to a unique spoke hole 120. Each flange hole 140 has an inner opening 142 in the corresponding inner surface 136, and an outer opening 144 in the corresponding outer surface 138. Hub 130 also has a barrel 148 which receives an axle of a bicycle.

Wheel 100 further includes non-rigid spoke members, or spokes 150. Each spoke 150 has non-rigid fibers 152 (not visible this Figure) covered by a jacket 154 having an inner diameter 156 (not visible) and an outer diameter 158 which is also the width 158 of spoke 150. Each spoke 150 has a length 160. Fibers 152 are substantially continuous along the length 160 of spoke 150. Alternatively, one or more of fibers 152 may be less than continuous along the length of spoke 150.

Each spoke 150 has an inner end 162 adjacent hub 130, and an outer end 164 adjacent rim 110. Each spoke 150 has a tube 170 about its outer end 164, and each tube 170 is formed with a tapered bore 171 opening away from the midpoint of the spoke. Each tube 170 is affixed to its corresponding outer end 164 by inserting the fibers 152 into the tube, and filling the tube with epoxy 175. Once hardened, the epoxy 175 and fibers 152 form a wedge within the tapered bore 171 such that any tension on the spoke draws the hardened wedge against the taper thereby securing the fiber within the tube. Alternatively, tube 170 may be affixed to outer end 164 by any other material of similar strength.

Tube 170 may be equipped with a hexagonal, reinforced head 165 which provides for added strength at the hub-end of the tube 170. This is helpful in preventing breakage for an non-axial tension on spoke 150, and facilitates the tightening of spoke 150.

Each tube 170 has a tube axis 172 and external spoke threads 174. Each spoke 150 also has an anchor (or eyelet or ferrule) 180 about its inner end 162. Each anchor 180 is formed with a tapered bore 181 opening away from the midpoint of the spoke. Each anchor 180 is affixed to its corresponding inner end 162 by inserting the fibers into the anchor, and filling the tapered bore 181 with epoxy 163. Once hardened, the epoxy and fibers form a wedge within the tapered bore 181 formed in the anchor 180 such that any tension on the spoke draws the hardened wedge against the taper thereby securing the fiber 150 within the anchor 180. Alternatively, anchor 180 may be affixed to inner end 162 by any other material of similar strength.

Each flange hole 140 is wider than spoke 150 but narrower than anchor 180, such that tube 170 about outer end 164 can be passed into inner opening 142 and out of outer opening 144, and such that the rest of spoke 150 can then be passed through flange hole 140 until anchor 180 comes into contact with inner surface 136 around inner opening 142, which causes inner end 162 to be retained in flange hole 140 by anchor 180.

Wheel 100 also includes nipples 190. One nipple 190 is shown in FIG. 1 in broken line, inside rim 110. There is a nipple 190 between each spoke hole 120 and its corresponding nipple access hole 124. Each nipple 190 has a nipple opening 192, nipple threads 194 inside nipple opening 192, a collar 196, and a nipple head 198. Once each spoke 150 is passed through flange hole 140 until anchor 180 comes into contact with inner surface 136 around inner opening 142, tube 170 is positioned and threaded into the corresponding nipple 190 via inter-engagement of spoke threads 174 with nipple threads 194. This causes tube 170 to be retained in nipple 190 such that tube axis 172 is perpendicular to wheel axis 104 (shown in FIG. 1). The retention of tube 170 in nipple 190, and of inner end 162 in flange hole 140 by anchor 180, causes spoke 150 to be held taut between rim 110 and hub 130.

FIG. 1 shows eight (8) spokes 150 attached to right flange 132, and eight (8) spokes 150 attached to left flange 134 (not visible, behind right flange 132), for a total of sixteen (16) spokes 150. Wheel 100 may alternatively have more or fewer than sixteen (16) spokes 150. For example, wheel 100 may have twelve (12) spokes 150, six (6) spokes 150 attached to each of flanges 132 and 134. While it is also possible to have different numbers of spokes 150 attached to each of flanges 132 and 134, having the same number of spokes attached to each of flanges 132 and 134 balances the load on the flanges 132 and 134.

Figure 2:
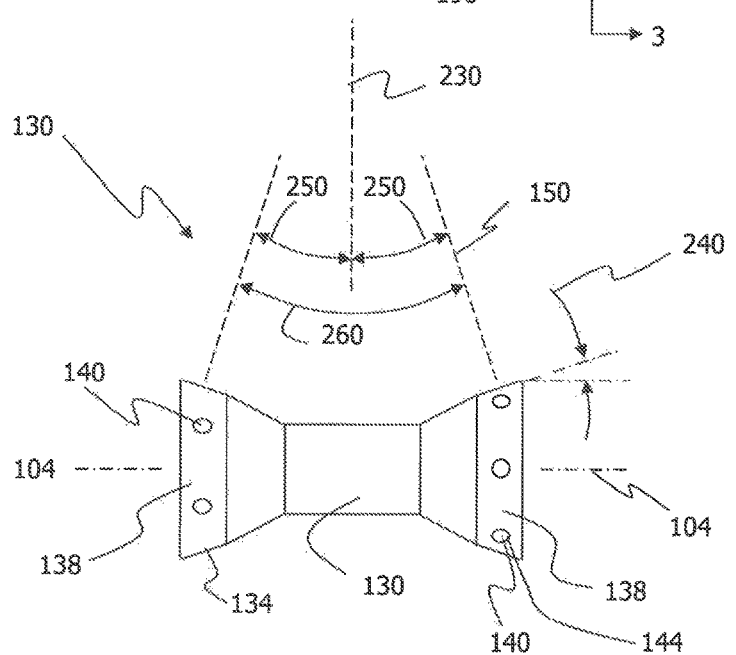
FIG. 2 is a rear detail view of the first preferred embodiment of the wheel with flexible spokes of the present invention, showing the hub, the angle between spokes on the left side of the wheel and spokes on the right side of the wheel, and the angle of the hub surface at the point of attachment of each spoke to the hub.

FIG. 2 is a rear view of hub 130. FIG. 2 shows the angle that one of the spokes 150 is attached to right flange 132, and the angle that one of the spokes 150 is attached to left flange 134. In FIG. 2, the right side of wheel 100 is on the right side of FIG. 2, and the left side of wheel 100 is on the left side of FIG. 2. Broken line 230 in FIG. 2 represents a plane 230 that bisects wheel 100 between the right side and left side of wheel 100. Plane 230 is perpendicular to wheel axis 104. Each outer surface 138 has the shape of a conical section that has an angle 240 to wheel axis 104. Each spoke 150 extends perpendicularly from the corresponding outer surface 138. Therefore, each spoke 150 extends from outer surface 138 at an angle 250 to plane 230. This means that the magnitude of angle 260 between spoke 150 attached to right flange 132 and spoke 150 attached to left flange 134, is twice the magnitude of angle 250.

FIG. 3 shows a partial cross-sectional detail view of a spoke 150 with its inner end 162 retained in flange hole 140 by anchor 180, and tube 170 about to be received in nipple 190 in rim 110. FIG. 3 shows how nipple 190 is retained in spoke hole 120. Spoke hole width 122 allows the portion of nipple 190 around nipple opening 192 to pass through spoke hole 120, but does not allow collar 196 to pass through spoke hole 120, such that nipple is retained in spoke hole 120 by the tension of spoke 150 on nipple 190 once tube 170 is threaded into nipple 190. FIG. 3 also shows spoke threads 174 which inter-engage with nipple threads 194 to thread tube 170 into nipple 190. With tube 170 retained in nipple 190, tube axis 172 is perpendicular to wheel axis 104 (not shown) and intersects the corresponding spoke hole 120. Spoke holes 120 lie in plane 230. While spoke holes 120 may alternatively be adjacent plane 230, spoke holes 120 being in plane 230 causes the forces of spokes 150 to be placed on rim 110 where plane 230 intersects rim 110, which is the middle of the inner perimeter 112 of rim 110. With spoke holes 120 in plane 230, and each tube 170 received in the corresponding nipple 190, tube axis 172 also lies in plane 230.

In FIG. 3, tube axis 172 coincides with the broken line representing plane 230. However, because each spoke 150 extends at angle 250 to plane 230, each spoke 150 extends from its tube 170 at angle 250 to tube axis 172. This means that there is a bend in spoke 150 at an angle 250 at the point 320 where spoke 150 protrudes from tube 170. With steel spokes, such a bend would weaken the spoke and ultimately cause the spoke to fail. However, with spokes 150, such a bend does not damage spokes 150, because fibers 152 are flexible and resilient yet strong such that spokes 150 retain their integrity and strength even when bent under tension in the manner described. Therefore, spokes 150 can bend without weakening or failing. Furthermore, each of spokes 150 is three times as strong, and weighs half as much, as a steel spoke that would otherwise be used in its place. This allows the width 158 of each of spokes 150 to be greater than that of a steel spoke that would be used in its place. In the alternative, the width 158 of each spoke 150 may be less than or equal to the width of a steel spoke that would be used in its place; the strength of each of spokes 150 may be greater or less than three times that of a steel spoke that would be used in its place; and the weight of each of spokes 150 may be greater or less than half that of a steel spoke that would be used in its place.

Rim 110, hub 130, tube 170, anchor 180 and nipple 190, in a preferred embodiment, are made of aluminum. Alternatively, any of rim 110, hub 130, tube 170, anchor 180 or nipple 190 may be made of any other material of comparable strength. In a preferred embodiment of the present invention, fibers 152 are a bundle of thermotropic liquid crystal fibers that exhibit high strength, low creep, and weather resistance. For instance, the fibers could be a PBO fiber such as Zylon®, a strong yet lightweight fiber, available from Toyobo. Alternatively, fibers 152 may be made of any other material having comparable weight and strength. Jacket 154 is made of Rilsan®, a high-performance polyamide. Alternatively, jacket 154 may be made of any other material having comparable weight and strength. Each nipple access hole 124 allows access to nipple head 198 so that it can be turned to facilitate the threading of nipple 190 onto tube 170. For instance, a hexagonal head nut-driver may be positioned over nipple 190 and rotated to tighten spoke 150 in place.

FIG. 4 shows a cross-sectional detail view of the inside of a spoke 150, showing the fibers 152, and inner diameter 156 of jacket 154. Fibers 152 are gathered in forty-four (44) bundles 410 of nine-hundred ninety-six (996) filaments each bundle, for a total of 43,824 filaments in spoke 150. This great number of filaments is one factor contributing to the great strength of spoke 150, while minimizing the weight of spoke 150. The fibers 152 may have a modulus of elasticity greater than 1 million psi, an ultimate elongation of about 0.01% to 20%, and a tensile strength greater than about $0.2 \times 10^6$ psi. Spoke 150 has a breaking strength of 3,600 pounds. Alternatively, the number of bundles 410 may be greater or less than 44; the number of filaments in each bundle 410 may be greater or less than 996; and the breaking strength of spoke 150 may be greater or less than 3,600 pounds.

Figure 5:
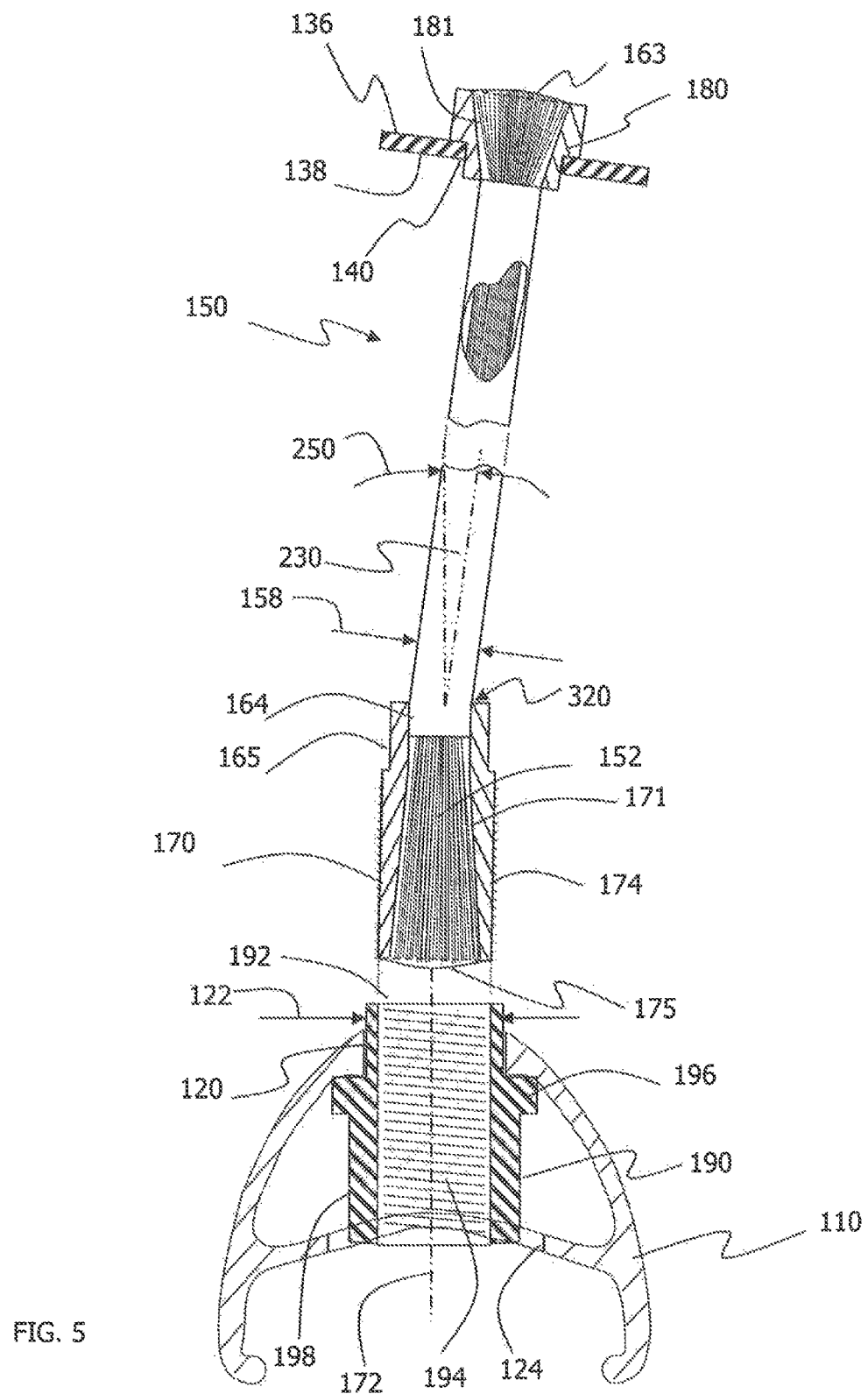
FIG. 5 is a cross-sectional view of the first preferred embodiment of the wheel with flexible spokes of the present invention showing cross-sectional portions of the rim and hub, and showing how each tube, once attached to the rim, would extent away at an angle from the nipple in the rim.

Referring to FIG. 5, a cross-sectional view of the first preferred embodiment of the wheel with flexible spokes of the present invention showing cross-sectional portions of the rim and hub is shown. As can be appreciated from FIG. 5, the width of rim 110 is just slightly wider than the width of nipple 190. As a result, it is necessary that the nipple be aligned so that the tube extends radically inward from rim 110. Because of this positioning, it is important that spoke 150 be flexible as it leaves tube 190 so as to accommodate angle 250 without any decrease in strength and durability. Due to the number of fiber strands contained within spoke 150, there is no noticeable decrease in strength despite the off-axis tension.

When tension is applied to spoke 150, collar 196 strikes the inside surface of rim 110 and maintains the nipple, and corresponding sleeve, in its perpendicular arrangement.

While the wheel with flexible spokes of the present invention as herein shown and disclosed in detail is fully capable of obtaining the objects and providing the advantages herein before stated, it is to be understood that it is merely illustrative of preferred and alternative embodiments of the invention and that no limitations are intended to the details of construction or design herein shown other than as described in the appended claims.

I claim:

1. A flexible spoke comprising:
   an anchor formed with a tapered bore and is configured to be received by a hub;
   a tube formed with a tapered bore and is configured to be attached to a rim; and
   a flexible shaft comprising a non-rigid fiber material having a first end formed as a first end wedge to be received by said tapered bore of said anchor and a second end formed as a second end wedge to be received by said tapered bore of said tube, wherein said first end wedge and said second end wedge each consists of said non-rigid fiber material and an epoxy, and wherein said flexible shaft extends through said anchor and said tube, said flexible shaft extends from said tube at a spoke angle greater than 0 degrees.

2. A flexible spoke comprising:
   an anchor formed with a tapered bore and is configured to be received by a hub;
   a nipple configured to be received by a rim;
   a tube formed with a tapered bore and is configured to attach to said nipple;
   a flexible shaft comprising a non-rigid fiber material having a first end formed as a first end wedge to be received by said tapered bore of said anchor and a second end formed as a second end wedge to be received by said tapered bore of said tube, wherein said first end wedge and said second end wedge each consists of said non-rigid fiber material and an epoxy, and wherein said flexible shaft extends through said anchor and said tube, said flexible shaft extends from said tube at a spoke angle greater than 0 degrees.

3. The flexible spoke of claim 2, wherein said flexible shaft further comprises a jacket covering said non-rigid fiber material.

4. The flexible spoke of claim 3, wherein said tube further comprises external threads.

5. The flexible spoke of claim 4, wherein said tube further comprises a reinforced hexagonal head.

6. The flexible spoke of claim 5, wherein said nipple comprises a threaded bore formed to threadably receive said external threads of said tube.

7. The flexible spoke of claim 6, wherein said nipple further comprises a collar.

8. The flexible spoke of claim 7, wherein said nipple further comprises a nipple head.

9. The flexible spoke of claim 8, wherein said nipple head is hexagonal shaped.

10. A flexible spoke comprising:
an anchor formed with a tapered bore and is configured to be received by a hub;
a tube formed with a tapered bore and external threads;
a nipple formed with a threaded bore to receive said external threads of said tube and is configured to be received by a rim, wherein said tube is secured to said nipple; and
a flexible shaft comprising a non-rigid fiber material covered by a jacket having a first end formed as a first end wedge to be received by said tapered bore of said anchor and a second end formed as a second end wedge to be received by said tapered bore of said tube, wherein said first end wedge and said second end wedge each consists of said non-rigid fiber material and an epoxy, and wherein said flexible shaft extends through said anchor and said tube, said flexible shaft extends from said tube at a spoke angle greater than 0 degrees.

11. The flexible spoke of claim 10, wherein said tube further comprises a reinforced hexagonal head.

12. The flexible spoke of claim 11, wherein said nipple further comprises a collar.

13. The flexible spoke of claim 12, wherein said nipple further comprises a nipple head.

14. The flexible spoke of claim 13, wherein said nipple head is hexagonal shaped.

15. The flexible spoke of claim 10, wherein said non-rigid fiber material comprises forty-four (44) bundles of nine-hundred ninety-six filaments in each bundle.

16. The flexible spoke of claim 10, wherein said non-rigid fiber material comprises a material having a modulus of elasticity greater than 1 million psi, an ultimate elongation of about 0.01% to 20%, and a tensile strength greater than about $0.2 \times 10^6$ psi.

17. The flexible spoke of claim 10, wherein said flexible shaft has a breaking strength of at least 3,600 pounds.

18. The flexible spoke of claim 10, wherein said non-rigid fiber material is a thermotropic liquid crystal fiber.

19. The flexible spoke of claim 10, wherein said jacket is made of a polyamide.

* * * * *